(12) United States Patent
Greene et al.

(10) Patent No.: US 9,846,881 B2
(45) Date of Patent: Dec. 19, 2017

(54) FRUGAL USER ENGAGEMENT HELP SYSTEMS

(71) Applicant: Palo Alto Research Center Incorporated, Palo Alto, CA (US)

(72) Inventors: Daniel H. Greene, Sunnyvale, CA (US); Marzieh Nabi-Abdolyousefi, San Jose, CA (US); Matthew E. Klenk, San Francisco, CA (US); Johan de Kleer, Los Altos, CA (US); Shekhar Gupta, Sunnyvale, CA (US); Ion Matei, Sunnyvale, CA (US); Kyle D. Dent, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 448 days.

(21) Appl. No.: 14/577,982

(22) Filed: Dec. 19, 2014

(65) Prior Publication Data

US 2016/0180347 A1 Jun. 23, 2016

(51) Int. Cl.
*G06Q 30/00* (2012.01)
*G06Q 10/00* (2012.01)
*G06Q 50/16* (2012.01)

(52) U.S. Cl.
CPC ........... *G06Q 30/016* (2013.01); *G06Q 10/20* (2013.01); *G06Q 50/163* (2013.01)

(58) Field of Classification Search
CPC .... G06Q 10/20; G06C 30/016; G06C 50/163; G05B 15/02

(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Mahadevan, Priya, et al. "Orbis: rescaling degree correlations to generate annotated internet topologies." ACM SIGCOMM Computer Communication Review. vol. 37. No. 4. ACM, 2007.

(Continued)

*Primary Examiner* — John H Le
(74) *Attorney, Agent, or Firm* — Shun Yao; Park, Vaughan, Fleming & Dowler LLP (57) ABSTRACT

One embodiment of the present invention provides a system for providing assistance to a user of a product in diagnosing faults in the product. During operation, the system receives, at a help server, data associated with current and/or past operation of the product; performs an optimization to determine a sequence of diagnostic actions that is expected to maximize a net benefit to the user. The sequence of diagnostic actions includes one or more actions that require the user to perform at least one task, and performing the optimization involves accounting for costs to the user for performing the at least one task and savings to the user for correcting the faults. The system then interacts with the user, which involves presenting the sequence of diagnostic actions to the user.

21 Claims, 4 Drawing Sheets

(58) Field of Classification Search
USPC ......... 702/179, 183, 185; 700/276; 705/304; 714/57; 715/771
See application file for complete search history.

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |
| 6,052,683 | A | 4/2000 | Irwin |
| 6,091,724 | A | 7/2000 | Chandra |
| 6,173,364 | B1 | 1/2001 | Zenchelsky |
| 6,226,618 | B1 | 5/2001 | Downs |
| 6,233,646 | B1 | 5/2001 | Hahm |
| 6,332,158 | B1 | 12/2001 | Risley |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,769,066 | B1 | 7/2004 | Botros |
| 6,772,333 | B1 | 8/2004 | Brendel |
| 6,862,280 | B1 | 3/2005 | Bertagna |
| 6,901,452 | B1 | 5/2005 | Bertagna |
| 6,917,985 | B2 | 7/2005 | Madruga |
| 6,968,393 | B1 | 11/2005 | Chen |
| 6,981,029 | B1 | 12/2005 | Menditto |
| 7,013,389 | B1 | 3/2006 | Srivastava |
| 7,031,308 | B2 | 4/2006 | Garcia-Luna-Aceves |
| 7,061,877 | B1 | 6/2006 | Gummalla |
| 7,206,860 | B2 | 4/2007 | Murakami |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,382,787 | B1 | 6/2008 | Barnes |
| 7,444,251 | B2 | 10/2008 | Nikovski et al. |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,769,887 | B1 | 8/2010 | Bhattacharyya |
| 7,779,467 | B2 | 8/2010 | Choi |
| 7,801,177 | B2 | 9/2010 | Luss |
| 7,801,702 | B2 * | 9/2010 | Berbaum ............... G06F 11/27 701/31.4 |
| 7,816,441 | B2 | 10/2010 | Elizalde |
| 7,831,733 | B2 | 11/2010 | Sultan |
| 7,908,337 | B2 | 3/2011 | Garcia-Luna-Aceves |
| 7,924,837 | B1 | 4/2011 | Shabtay |
| 7,953,885 | B1 | 5/2011 | Devireddy |
| 8,000,267 | B2 | 8/2011 | Solis |
| 8,010,691 | B2 | 8/2011 | Kollmansberger |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,312,064 | B1 | 11/2012 | Gauvin |
| 8,386,622 | B2 | 2/2013 | Jacobson |
| 8,467,297 | B2 | 6/2013 | Liu |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,688,619 | B1 | 4/2014 | Ezick |
| 8,699,350 | B1 | 4/2014 | Kumar |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,862,774 | B2 | 10/2014 | Vasseur |
| 8,903,756 | B2 | 12/2014 | Zhao |
| 8,937,865 | B1 | 1/2015 | Kumar |
| 9,071,498 | B2 | 6/2015 | Beser |
| 9,112,895 | B1 | 8/2015 | Lin |
| 2002/0010795 | A1 | 1/2002 | Brown |
| 2002/0048269 | A1 | 4/2002 | Hong |
| 2002/0054593 | A1 | 5/2002 | Morohashi |
| 2002/0077988 | A1 | 6/2002 | Sasaki |
| 2002/0078066 | A1 | 6/2002 | Robinson |
| 2002/0138551 | A1 | 9/2002 | Erickson |
| 2002/0176404 | A1 | 11/2002 | Girard |
| 2002/0188605 | A1 | 12/2002 | Adya |
| 2002/0199014 | A1 | 12/2002 | Yang |
| 2003/0046437 | A1 | 3/2003 | Eytchison |
| 2003/0048793 | A1 | 3/2003 | Pochon |
| 2003/0051100 | A1 | 3/2003 | Patel |
| 2003/0074472 | A1 | 4/2003 | Lucco |
| 2003/0097447 | A1 | 5/2003 | Johnston |
| 2003/0140257 | A1 | 7/2003 | Peterka |
| 2004/0024879 | A1 | 2/2004 | Dingman |
| 2004/0030602 | A1 | 2/2004 | Rosenquist |
| 2004/0073715 | A1 | 4/2004 | Folkes |
| 2004/0139230 | A1 | 7/2004 | Kim |
| 2004/0221047 | A1 | 11/2004 | Grover |
| 2004/0225627 | A1 | 11/2004 | Botros |
| 2004/0252683 | A1 | 12/2004 | Kennedy |
| 2005/0003832 | A1 | 1/2005 | Osafune |
| 2005/0028156 | A1 | 2/2005 | Hammond |
| 2005/0043060 | A1 | 2/2005 | Brandenberg |
| 2005/0050211 | A1 | 3/2005 | Kaul |
| 2005/0074001 | A1 | 4/2005 | Mattes |
| 2005/0149508 | A1 | 7/2005 | Deshpande |
| 2005/0159823 | A1 | 7/2005 | Hayes |
| 2005/0198351 | A1 | 9/2005 | Nog |
| 2005/0249196 | A1 | 11/2005 | Ansari |
| 2005/0259637 | A1 | 11/2005 | Chu |
| 2005/0262217 | A1 | 11/2005 | Nonaka |
| 2005/0289222 | A1 | 12/2005 | Sahim |
| 2006/0010249 | A1 | 1/2006 | Sabesan |
| 2006/0029102 | A1 | 2/2006 | Abe |
| 2006/0039379 | A1 | 2/2006 | Abe |
| 2006/0051076 | A1 | 3/2006 | Ohkawa |
| 2006/0072523 | A1 | 4/2006 | Richardson |
| 2006/0099973 | A1 | 5/2006 | Nair |
| 2006/0129514 | A1 | 6/2006 | Watanabe |
| 2006/0133343 | A1 | 6/2006 | Huang |
| 2006/0173831 | A1 | 8/2006 | Basso |
| 2006/0193295 | A1 | 8/2006 | White |
| 2006/0206445 | A1 | 9/2006 | Andreoli |
| 2006/0215684 | A1 | 9/2006 | Capone |
| 2006/0223504 | A1 | 10/2006 | Ishak |
| 2006/0256767 | A1 | 11/2006 | Suzuki |
| 2006/0268792 | A1 | 11/2006 | Belcea |
| 2007/0019619 | A1 | 1/2007 | Foster |

(56) References Cited

U.S. PATENT DOCUMENTS

| | | |
|---|---|---|
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0047418 A1* | 2/2011 | Drees ............... G05B 15/02 714/57 |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0022700 A1* | 1/2012 | Drees ............... G05B 15/02 700/276 |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |

(56) References Cited

U.S. PATENT DOCUMENTS

| | | |
|---|---|---|
| 2012/0221150 A1 | 8/2012 | Arensmeier |
| 2012/0224487 A1 | 9/2012 | Hui |
| 2012/0257500 A1 | 10/2012 | Lynch |
| 2012/0259583 A1* | 10/2012 | Noboa .............. G05B 15/02 702/179 |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0190940 A1 | 7/2013 | Sloop et al. |
| 2013/0197698 A1 | 8/2013 | Shah et al. |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier et al. |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| EP | 2674822 A1 | 12/2013 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Mahadevan, Priya, et al. "Systematic topology analysis and generation using degree correlations." ACM SIGCOMM Computer Communication Review. vol. 36. No. 4. ACM, 2006.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn$2E.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusi.

Hoque et al., "NLSR: Named-data Link State Routing Protocol", Aug. 12, 2013, ICN'13.

(56) References Cited

OTHER PUBLICATIONS

D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer ScienceVolume 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE Infocom 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," Parc, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

(56) References Cited

OTHER PUBLICATIONS

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik-ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (pg. 3843).
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
L. Zhou, V. Varadharajan, and M. Hitch Ens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
Mobility First Project [online], http://mobilityfirst.winlab.rutgers.edu/, Downloaded Mar. 9, 2015.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pan Dey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

(56) References Cited

OTHER PUBLICATIONS

Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
D. Trossen and G. Parisis, "Designing and realizing and information-centric Internet", IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., 'NLSR: Named-data Link State Routing Protocol', Aug. 12, 2013, ICN 2013, pp. 15-20.
Nadeem Javaid, "Analysis and design of quality link metrics for routing protocols in Wireless Networks", PhD Thesis Defense, Dec. 15, 2010, Universete Paris-Est.
Brambley, Michael, A novel, low-cost, reduced-sensor approach for providing smart remote monitoring and diagnostics for packaged air conditioners and heat pumps. Pacific Northwest National Laboratory, 2009.
McWilliams, Jennifer A., and Iain S. Walker. "Home Energy Article: A Systems Approach to Retrofitting Residential HVAC Systems." Lawrence Berkeley National Laboratory (2005).
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Heckerman, David, John S. Breese, and Koos Rommelse. "Decision-Theoretic Troubleshooting." Communications of the ACM. 1995.
Narasimhan, Sriram, and Lee Brownston. "HyDE—A General Framework for Stochastic and Hybrid Modelbased Diagnosis." Proc. DX 7 (2007): 162-169.
Heinemeier, Kristin, et al. "Uncertainties in Achieving Energy Savings from HVAC Maintenance Measures in the Field." ASHRAE Transactions 118.Part 2 (2012).
Ji, Kun, et al. "Prognostics enabled resilient control for model-based building automation systems." Proceedings of the 12th Conference of International Building Performance Simulation Association. 2011.
Katipamula, Srinivas, and Michael R. Brambley. "Review article: methods for fault detection, diagnostics, and prognostics for building systems—a review, Part I." HVAC&R Research 11.1 (2005): 3-25.
Katipamula, Srinivas, and Michael R. Brambley. "Review article: methods for fault detection, diagnostics, and prognostics for building systems—a review, Part II." HVAC&R Research 11.2 (2005): 169-187.
Shani, Guy, Joelle Pineau, and Robert Kaplow. "A survey of point-based POMDP solvers." Autonomous Agents and Multi-Agent Systems 27.1 (2013): 1-51.
Schein, Jeffrey, and Steven T. Bushby. A Simulation Study of a Hierarchical, Rule-Based Method for System-Level Fault Detection and Diagnostics in Hvac Systems. US Department of Commerce,[Technology Administration], National Institute of Standards and Technology, 2005.
Sheppard, John W., and Stephyn GW Butcher. "A formal analysis of fault diagnosis with d-matrices." Journal of Electronic Testing 23.4 (2007): 309-322.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Sun, Ying, and Daniel S. Weld. "A framework for model-based repair." AAAI. 1993.
Walker, Iain S. Best practices guide for residential HVAC Retrofits. No. LBNL-53592. Ernest Orlando Lawrence Berkeley National Laboratory, Berkeley, CA (US), 2003.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

FRUGAL USER ENGAGEMENT HELP SYSTEMS

BACKGROUND

Field

This disclosure is generally related to help systems that rely on user input for diagnosis purposes. More specifically, this disclosure is related to such a help system that is frugal with user engagement.

Related Art

Many current customer-assistance systems that provide assistance for products or services rely on extra information provided or extra steps taken by the customers themselves to help with diagnosis of problems associated with the products or services. For example, when a user experience problems with his computer system, he may use a self-help system available on the website of the product maker to troubleshoot and to fix the problems. Before performing the diagnostics, the self-help system may require the user to place his computer system into a standard configuration. For example, the user may be asked to re-install certain software. Another example can be a call center that collects extra information from a calling customer in order to route the call to specific service personnel. Such an approach reduces the burden on providers of the help systems at the expense of the customers' involvement in diagnostics. In some instances a customer may be asked to take unnecessary steps, just on the off chance that it will save the help provider extra costs. The shift of costs from help providers to customers may often not benefit the customers.

In many applications the help provider may not be motivated to provide a high-quality help system because users of such a system may have already purchased the product or service, and the help system only needs to meet minimum requirements. In such settings a provider may shift to the user, as much as possible, the burden of diagnosis and repair, and the user, having already purchased the product, may have no choice but to bear the extra costs.

Nevertheless, in many markets, particularly those covered by third-party surveys and reputation management systems, the quality of product support is an integral part of the product's overall reputation for quality. In such markets, help systems that provide limited assistance or are too burdensome to users may become an obstacle in attracting more users to adopt the corresponding products or services.

SUMMARY

One embodiment of the present invention provides a system for providing assistance to a user of a product in diagnosing faults in the product. During operation, the system receives, at a help server, data associated with current and/or past operation of the product, and performs an optimization to determine a sequence of diagnostic actions that is expected to maximize a net benefit to the user. The sequence of diagnostic actions includes one or more actions that require the user to perform at least one task, and performing the optimization involves accounting for costs to the user for performing the at least one task and savings to the user for correcting the faults. The system then interacts with the user, which involves presenting the sequence of diagnostic actions to the user.

In a variation on this embodiment, the system further performs an initial testing to determine a baseline operating profile of the product, and compares the received data associated with the current and/or past operation of the product to determine whether the product is degraded.

In a variation on this embodiment, the product includes a heating, ventilation, and air conditioning (HVAC) system. Performing the optimization involves: obtaining a weather prediction, and based on the obtained weather prediction, including in the determined sequence of actions a delaying-to-learn-more action that delays the interaction with the user for a predetermined time.

In a variation on this embodiment, the sequence of diagnostic actions includes one or more of: a survey action, a research action, and an experiment action.

In a variation on this embodiment, the system estimates the cost to the user for performing the at least one task by one or more of: learning a cost model associated with the user, wherein the cost model specifies how the user values his time and the user's preference and skills, asking the user to self-classify, and asking the user to answer a set of questions.

In a variation on this embodiment, the system provides additional incentives to the user in response to the optimization determining that the maximized net benefit to the user is less than a predetermined threshold, thereby motivating the user to remain engaged.

In a variation on this embodiment, interacting with the user further involves presenting to the user explanations of the net benefit, thereby motivating the user to perform the at least one task.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system that provide remote assistance to customers of a product or service. More specifically, when diagnosing a faulty or degraded product, the help system engages the customers in providing information that may be useful to the diagnosis. The help system optimizes the decision for user engagement based on cost of user participation (which is user-dependent and can be learned by the system over time or by using a survey) and the expected benefit to the users. The help system can be triggered by a customer call or a detection of product degradation. At any point of the operation, when there is no possible action that can lead to positive expected benefit to the user, the help system terminates. Note that this termination may leave the problem unresolved; nevertheless the continued operation of the degraded system may be of net benefit to the user (a less efficient air condition is better than no air condition in hot summer days). A future time, when more data is available, may be a better time for diagnosis and repair.

In this disclosure, the term "help system" broadly refers to a system that provides help to customers with products or services. It can include call centers, online tools, and mobile apps.

Frugal User Engagement Help System (FUEHS) for Improving Energy Efficiency of an HVAC System Many modern energy systems, such as water heaters, refrigerators, and HVAC (heating, ventilation, and air conditioning) systems include control systems that are able to keep these systems functioning well, even when they have partial faults. As these systems degrade, the effective built-in control is able to make sure that there is little impact on perceived performance; instead, the impact is on energy efficiency. For example, a faulty HVAC system may continue to function in terms of regulating the room temperature at the expense of consuming more energy. This additional energy consumption is often buried in energy bills and not directly perceived. Without direct feedback, users are often not motivated to fix the degraded system, thus missing the chance of substantial energy savings. Contact by the utility providers may help the customers find energy savings, but the customers may be particularly sensitive to interaction costs (in terms of time and resources), and may not have strong goals to save energy.

To address such a problem, embodiments of the present invention provide a proactive help system that contacts users based on preliminary evidence (such as a user's smart meter data of a phone call reporting a problem) and is frugal with user engagement thereafter. More specifically, such a frugal user engagement help system (FUEHS) ensures that the user will have net positive expected benefits at each step that expects participation from the user; hence, the user is more motivated to cooperate with the diagnosis and repair process. Although there are other approaches that attempt to diagnose HVAC systems remotely (without sending a technician to a user's home), they generally require significant instrumentation (with specially designed sensors). Note that, although the instrumentation may provide more accurate and rapid diagnosis, it tends to be more expensive and may not be readily available in many cases. Other diagnostic approaches that engage users often do not account for the cost of user participation. In contrast, FUEHS technology provides an online, interactive approach to diagnosis that takes into consideration the cost of user participation. More specifically, this approach focuses on the decision process. At each step, the system assures the users that they are required to invest in the diagnosis because the end result benefits the users. In contrast to instrumentation-heavy solutions, FUEHS uses little instrumentation a priori; instead, additional investigation, tests, and instrumentation are used only when there are compelling potential savings to HVAC performance.

Figure 1:
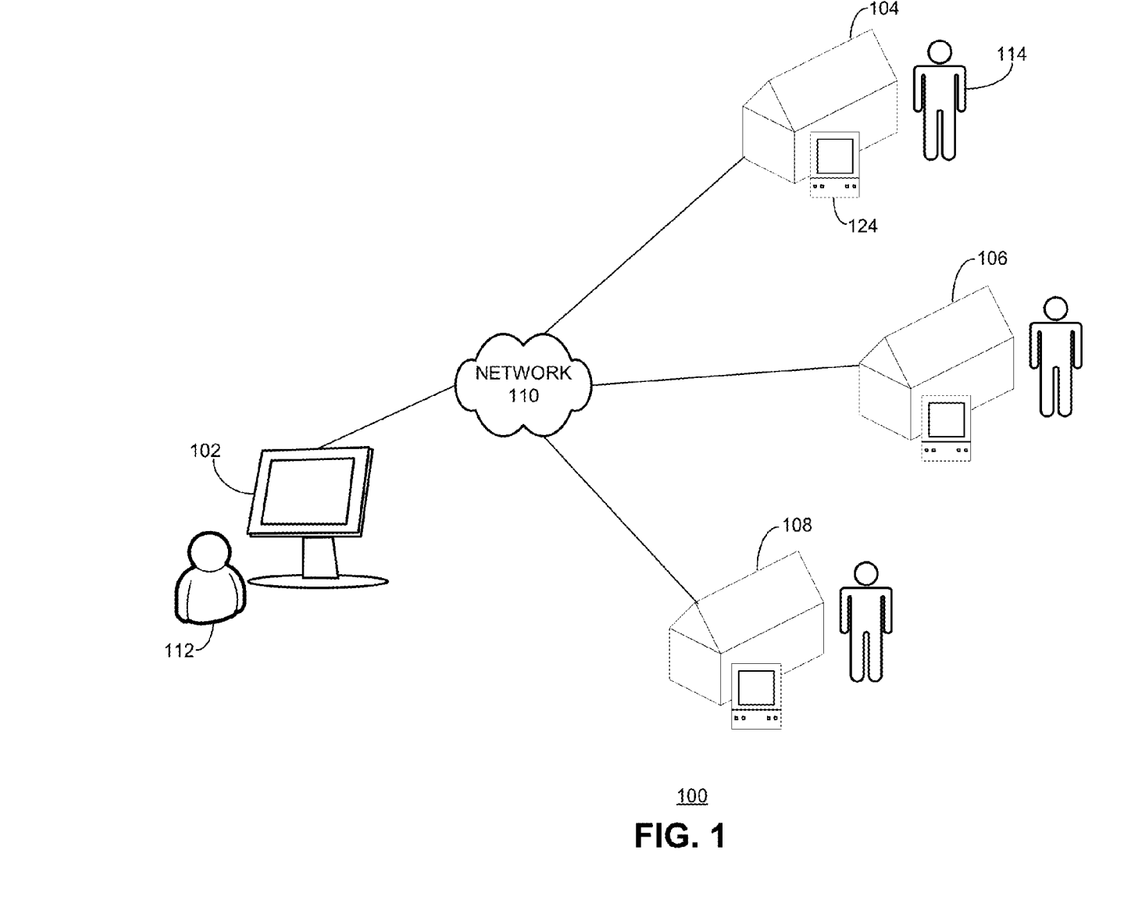
FIG. 1 presents a diagram illustrating the architecture of an exemplary frugal user engagement help system (FUEHS), in accordance with an embodiment of the present invention.

FIG. 1 presents a diagram illustrating the architecture of an exemplary frugal user engagement help system (FUEHS), in accordance with an embodiment of the present invention. In FIG. 1, an FUEHS 100 includes a help server 102 that is coupled to homes 104, 106, and 108 via a network 110. In some embodiments, a home may include a smart meter that is capable of monitoring the performance of an HVAC system and communicating with help server 102. For example, home 104 is equipped with a smart meter 124, which couples to help server 102 via network 110. Note that network 110 may correspond to any type of wired or wireless communication channels capable of coupling together computing nodes, such as smart meters in customer homes (e.g., smart meter 124 in home 104) and help server 102. This includes, but is not limited to, a local area network (LAN), a wide area network (WAN), an enterprise's intranet, a virtual private network (VPN), and/or a combination of networks. In one or more embodiments of the present invention, network 110 includes the Internet. Network 110 may also include phone and cellular phone networks, such as a Global Systems for Mobile Communications (GSM) network or an LTE (long-term evolution) network. In some embodiments, network 110 can be used to gather data and to interact with the users, such as user 114 in home 104.

In some embodiments, a help system operator 112 may interact with users, such as a user 114 in home 104, using various communication techniques, such as telephone (wired or wireless), texting, online chatting, emailing, etc., in order to obtain information from the users and to instruct the users to take certain actions. For example, help system operator 112 may answer a service call from user 114. During the service call, help system operator 112 may, based on an optimization result of help server 102, instruct user 114 to check the airflow of a register of the HVAC system.

Before FUEHS 100 can start to diagnose a faulty product, initial background testing is needed to obtain baseline parameters associated with normal operation of the product. For example, the help system may need to learn the amount of energy an HVAC system consumes under normal working conditions. This background test can be performed by analyzing the smart meter data (either electric or gas). Note that, although the resolution of the smart meter data is often too low to support precise HVAC diagnosis, it provides sufficient information to identify bad trends that justify activation of the diagnostic process. In most cases, the background testing is an analytic operation performed by the provider of the help system, and does not engage or cost anything of the user.

Various analytical methods can be useful for deriving the baseline operating parameters of an HVAC system of a building. For example, the help system can disaggregate the smart meter data to separate the energy usage of the HVAC system from other loads within the building, or use the HVAC electric fan power as a proxy for gas consumption. In some embodiments, the background testing may involve modeling weather effects on the building, so that HVAC degradation can be distinguished from normal weather-related load changes (as hot days lead to an over-worked HVAC system). In some embodiments, the background testing can involve inferring the occupancy of the building, particularly the trend in occupancy, so that HVAC degradation can be distinguished from occupancy-related load changes (especially the effect of more people entering and leaving the building). In some embodiments, the background testing may involve filtering the data to look for degradation of the HVAC system when other energy consumption activity is minimal. For example, overnight data may be more relevant to HVAC operation. When there is no obvious degradation, the help system can determine the baseline operating parameters of the HVAC system in the building.

Upon completion of the background testing, the help system can begin to diagnose faulty or degraded customer systems, such as an HVAC system. Note that, when the HVAC system is operating normally, there is no need to activate the help process of the FUEHS, which involves user engagement. In some embodiments, activation of the help process can be triggered by a number of events, including but not limited to: receiving a user request, and detecting performance degradation and the expected savings resulting from fixing the degradation exceeding a threshold value. It is obvious that, when a user reports (either by calling or making an online request) a problem, the help process should be activated immediately in order to assist the user with diagnosis and/or repairs. On the other hand, as discussed previously, much progressive degradation of HVAC systems will go unnoticed, and can result in significant amounts of energy being wasted. For example, a clogged air filter may lead to lowered HVAC efficiency, and may be ignored by the user. In such a situation, the help process can be automatically triggered (without a service call from the user) if the FUEHS observes the problem and determines that the cost to fix the problem is much less than the potential savings to the user. Using the same air filter example, based on the smart meter data and the previously performed baseline testing, the help system may determine that there is a performance degradation of the HVAC and calculate how much the HVAC has degraded (e.g., by 10%). The FUEHS can also calculate the amount of savings that that can be achieved from fixing the degradation. When the amount exceeds a predetermined threshold value (such as a $100), the help process can be automatically activated. For example, the user may be contacted and asked to check whether the air filter is clogged.

In some embodiments, the FUEHS may periodically (e.g., on a daily or weekly basis) compute the expected net benefit to the user resulting from engaging the user to fix the problem; once the expected benefit is positive, the help process is activated. Note that, although this approach of repeatedly attempting to activate the help process can be computationally more expensive, it has the advantage of taking into account both the savings obtained from repairing the HVAC and the costs of engaging the user.

Figure 2:
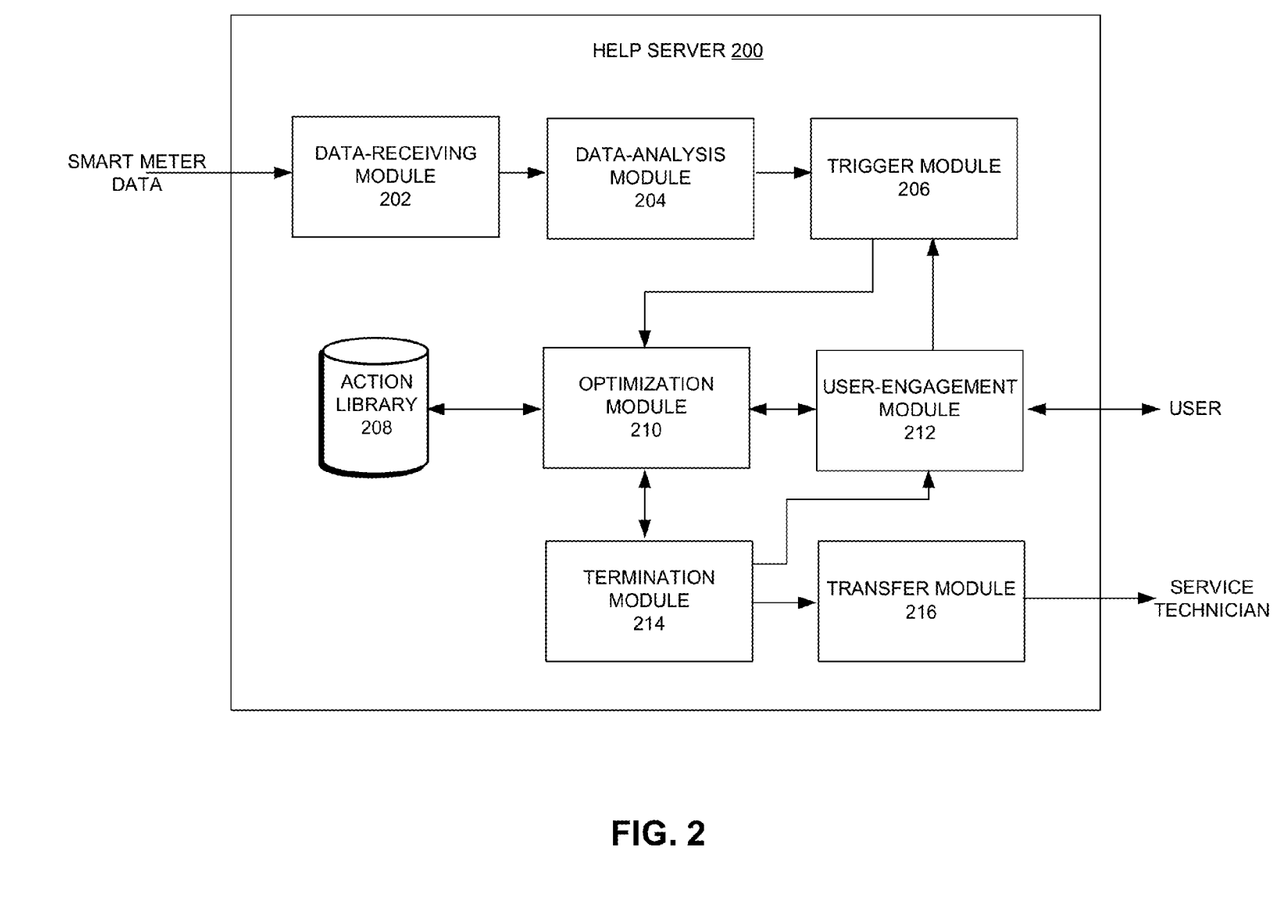
FIG. 2 presents a diagram illustrating the architecture of an exemplary help server, in accordance with an embodiment of the present invention.

FIG. 2 presents a diagram illustrating the architecture of an exemplary help server, in accordance with an embodiment of the present invention. In FIG. 2, a help server 200 includes a data-receiving module 202, a data-analysis module 204, a trigger module 206, an action library 208, an optimization module 210, a user-engagement module 212, a termination module 214, and a transfer module 216.

Data-receiving module 202 is responsible for receiving data that is relevant to helping the user. For equipment that consumes utility delivered power (e.g., HVAC, refrigeration systems, etc.), the smart meter data is a good source of information. The data received by data-receiving module 202 may include other types of data, such as weather data or sensor data.

Data-receiving module 202 sends received data to data-analysis module 204 for analysis. Note that, although the received smart meter data cannot provide detailed information related to the current operating conditions of the HVAC system, by analyzing the smart meter data, data-analysis module 204 is able to extract the energy usage trend of the HVAC system. In some embodiments, data-analysis module 204 maintains a baseline profile for the HVAC system. The baseline profile may include the energy usage profile of the HVAC system during different kinds of weather or different seasons of the year. By comparing the current energy usage (or trend of the energy usage) with the baseline profile, data-analysis module 204 can identify certain abnormal (or "bad") trends. A "bad" or abnormal trend may indicate performance degradation. For example, the baseline profile of an HVAC system may indicate that the energy usage gradually decreases as the seasons change from summer to fall. If data-analysis module 204 observes an upward energy usage trend during the same time period, it may infer that the HVAC is experiencing performance degradation. Data-analysis module 204 may also calculate to what extent the HVAC system has degraded. The output of data-analysis module 204, which can include the identified bad or abnormal trend, is then sent to trigger module 206.

Trigger module 206 determines, based on the output of data-analysis module 204, whether the help process should be activated. In some embodiments, trigger module 206 may evaluate the amount of money that can be saved if the HVAC degradation can be fixed, and determine whether such potential savings exceeds a threshold. If so, trigger module 206 activates optimization module 210 to determine an effective help process to address the degradation. In some cases, the help process engages the user (via user-engagement module 212) during the diagnosing process, and may possibly have the user fix the degraded HVAC system. Other events may also cause trigger module 206 to activate the help process. For example, trigger module 206 may receive a user request (forwarded by user-engagement module 212), and in response to such a request, trigger module 206 activates the help process.

Action library 208 stores a number of actions (user engagements) that can be applied during the help process. These actions are designed to elicit features of the building and the HVAC system, and to differentiate among different failures of the HVAC system. In some embodiments, an action can be specified with a number of features, including but not limited to: a protocol for interacting with the user, cost estimation, and a transformation of the belief representation of the system.

The protocol for interacting with the user specifies how the help system should engage the user. For example, the protocol may specify what questions to ask the user and what responses to collect from the user. The questions and responses facilitate gathering of new data that can be used for diagnosis. In some embodiments, the protocol for interacting with the user indicates the preferred communication channel, such as phone calls, text messages, emails, etc., for interacting with users.

The cost estimation represents the estimated cost of the user performing the action. In some embodiments, the cost may include the time spent by the user performing the action and the burden perceived by the user for performing the action. Note that the cost may be user-specific. For example, a particularly busy user may place more value on his time, and perceive a time-consuming action as a greater burden compared with a different user who has more leisure time. On the other hand, a user who is very sensitive to privacy may find answering the question about household occupancy burdensome. In some embodiments, estimating the cost of actions to a user may involve learning a model (which can be performed within user-engagement module 212) of the user's cost for participation in diagnosis. In some embodiments, the cost model can include a value of the user's time, as well as the user's preferences and skills in performing the actions. In some embodiments, the system allows the user to configure such a cost model. In some embodiments, the learning process happens concurrently with the diagnosis. The system gathers responses from the user while the user is performing the actions in order to establish a cost model. However, because of the need to interact lightly with the user, it might be simpler to ask the user to self-classify, choosing from among a few archetypes. For example, a user can identify himself as a handyman. The system can perform more powerful analytics (while it is not interacting with users) to learn the relevant characteristics of a few archetypes. In some embodiments, such self-identification can be achieved by the user completing a brief survey before or during diagnosis.

The transformation of the belief representation of the system indicates changes to the system based on the newly gathered data and any actions (such as replacing a component) that modify the system. Depending on the implementation of different fault-diagnosis algorithms, there are various belief representations of the system. In some embodiments, the fault-diagnosis process involves using a dependency matrix (D-matrix) or a diagnostic inference model (DIM) to capture the relationship between test outcomes and diagnosis. In such scenarios, the diagnostic system will have potential diagnoses ($d_1, d_2, d_3, \ldots$), actions or tests ($t_1, t_2, t_3, \ldots$), and implications $d_i \Rightarrow t_j$. An implication $d_i \Rightarrow t_j$ means that diagnosis $d_i$ will be detected by test $t_j$. If test $t_j$ is not true, then diagnosis $d_i$ can be eliminated. Hence, assuming single fault, a suitable "belief representation" of the system is the set D of remaining possible diagnoses. The initial D includes all possible diagnoses $D \leftarrow (d_1, d_2, d_3, \ldots)$. One or more of the possible diagnoses may be considered "normal," and do not require repairs. For an action that corresponds to test $t_j$, the transformation of the belief representation (D) is specified as the set of diagnoses that imply $t_j$; that is, all $d_i$ such that $d_i \Rightarrow t_j$. Note that there may be more than one diagnosis in the set $D_j$. If $t_j$ is false, the transformation of D consists of deleting certain diagnoses from the initial belief representation: $D \leftarrow D - D \cap D_j$.

Other diagnosis algorithms may require different belief representations. For example, a Bayesian approach to system identification might use a belief representation that includes the current prior distribution of parameters in the model. For example, the D-matrix described in the previous paragraph may be modified so that the belief update rule is a Bayesian update. More generally, a POMDP (partially observable Markov decision process) approach to diagnosis may use a belief representation $b=(b_1, b_2, b_3, \ldots)$ that is a vector of current probabilities corresponding to the potential diagnoses ($d_1, d_2, d_3, \ldots$). Other diagnosis approaches are also possible.

There are many actions stored in action library 208. Depending on the actual tasks performed by the user, some can be categorized as survey actions, research actions, experiment actions, and repairing/replacing actions. Moreover, depending on the tools that the user used for performing the actions, some actions are categorized as smartphone actions and actions requiring temporary instrumentation. There are also delaying-to-learn-more actions and provider actions.

A survey action entails asking the user one or more survey questions (by mail, phone or through a smartphone app). The questions that might be useful for HVAC diagnosis include such topics as: changes in occupancy (the arrival of a new baby, or long-term visitors); number of rooms in the building; typical thermostat settings; and kind of HVAC system. In most cases, these questions can be answered easily by the user. One or more questions may be asked as part of a single action. There are tradeoffs between the survey length and frequency. For example, the system can ask only the most relevant questions each time it surveys the user, which may result in more surveys being needed to achieve a correct diagnosis. Alternatively, the system may survey the user less frequently by batching together questions that might arise in the future. In some embodiments, both single and batch surveys can be registered in the action library (with appropriate costs), and the most beneficial strategy will be chosen by optimization module 210 when it performs the decision-theoretic optimization.

A research action asks the user to investigate a certain aspect of the HVAC system, his home, or the environment. Unlike a survey action, where the user might know the answer immediately, a research action typically requires more investigative effort from the user, such as: measuring the outside dimensions of the home, observing shading patterns, counting HVAC registers, checking whether a motor is hot, etc. In action database 208, these actions are often associated with higher costs to the user and, thus, will be used more carefully by the FUEHS.

An experiment action asks the user to perform a simple test, such as an airflow test, a thermal load test, or an HVAC stress test. To perform the airflow test, a user may be asked to place a tissue on a register, and observe whether HVAC activation disturbs the tissue. To perform the thermal load test, a user may be asked to change the blinds from open to closed, and to text a message when the blinds are changed. To perform the stress test, the user may be asked to turn up the thermostat by 4 degrees for two hours, and to text when the thermostat is changed.

A repairing/replacing action asks the user to perform certain simple repair or replacement tasks. For example, a user may be asked to replace an air filter or other components in the HVAC system. Note that sometimes trying the remedy may be the most cost-effective way of testing for a fault. When a repair is used as an action, a delaying-to-learn-more action is appended in order to determine success. In some embodiments, one or more simple repairs can be combined into one action.

Smartphone actions refer to actions that require a smartphone, more specifically the various components on the smartphone, such as camera, GPS, and microphone. For example, certain research actions may ask the user to photograph the HVAC nameplate (obtaining the model number), the outdoor shading on the roof, or the thermostat (during an experiment). A smartphone action may involve the user walking the perimeter of his house (estimating square footage from GPS tracks) or using GPS tracking to estimate occupancy. Another action may involve the user recording sounds of the HVAC system, or airflow at the registers.

Certain actions require specialized instruments. To facilitate such actions, the user is loaned additional sensing equipment, such as: RFID temperature tags, add-on sensors for his phone, and Wi-Fi-enabled temperature and power monitors.

The delaying-to-learn-more actions are similar to the initial background testing. A delaying-to-learn-more action typically includes an additional interval of time to wait for more data for the analytics to improve. For example, weather patterns can be used to predict the rate of occurrence of unusual stress events (e.g., very windy cold days, or hot days with no sun) that will improve the data set beyond the initial set used in the initial background testing. The cost of a delaying-to-learn-more action may include additional degraded operation of the HVAC system, which is balanced by less interaction with the user. In some embodiments, the diagnostic system may rely on weather predictions, such as the prediction of the occurrence of specific weather conditions (particularly hot or cold days) to determine whether a delaying-to-learn-more action could benefit the diagnosis system. In other words, the diagnosis system may determine that it is beneficial to "sleep" while waiting for new data that can be gathered on an extremely hot day, which can be a few days later. Hence, instead of asking the user to take certain actions now, the system temporarily pauses, not engaging the user but relying on background data gathering to make progresses.

Provider actions are actions that are performed by the provider of the help system. For example, the provider might use the cell phone app's location to select and analyze satellite imagery of the building.

In some embodiments, action library 208 can be both expanded and pruned. As operators of a call center discover ways to help users with new problems, new actions can be added to action library 208. Moreover, depending on the diagnostic algorithm, various methods can be used to reduce the size of action library 208 and the complexity of diagnosis computation. For example, using logical analysis, D-matrix tests that can be "covered" by less expensive tests may be deleted from action library 208. Statistical methods can also be used to delete actions that are seldom beneficial, based on data from model-based simulations or from actual usage.

Optimization module 210 is responsible for performing the diagnosis and running a decision-theoretic optimization during the diagnostic process. In other words, at each step of the diagnostic process, a decision is made to optimize the benefit to the user. Note that such decision-theoretic optimization takes into account the cost to users associated with the actions. Various approaches to diagnosis can be used, such as a D-matrix approach or POMDPs.

In some embodiments, the FUEHS uses a POMDP for diagnosis, and optimization module 210 performs a decision-theoretic optimization for a POMDP, represented as a 7-tuple: $(S,A,T,R,O,\Omega,b_0)$, with each component explained in detail below.

S is the set of states. In the example of HVAC diagnosis, S may include faults and other operating modes of the HVAC system. In some embodiments, states can correspond to multiple faults, or combinations of faults with operating modes of the system. Alternatively, a factored representation may be used for multiple faults. For simplicity, it is assumed here that there is a single normal operating state $s_0$, and each of the other states $s_i$ corresponds to a single fault $d_i$, although it will be understood that this may be expanded to include multiple faults.

A represents a set actions, as described previously.

T indicates the transition probabilities. More specifically, $T(s'|s,a)$ is the conditional probability that action a will cause a transition from state s to s'. In the HVAC diagnostic problem, most of the actions simply observe the state of the system. In other words, if the system is in state $s_i$ indicating fault $d_i$, then it will still have that fault after the action. The action may refine our belief about the state, but it will not change the state. Some actions may temporarily modify the operating mode of the system. For example, the action of raising the thermostat changes the operating mode of the HVAC. For simplicity, it is assumed that such actions just increase the probability of the current state. Some actions will attempt to fix a problem. If the fault is corrected, then S will transition into a normal operating state $s_0$, which is also identified as a terminal state.

R is the "reward" to the user. More specifically, R(s,a) indicates the reward for taking action a in state s. In HVAC diagnosis many of the rewards are slightly negative, corresponding to the cost of the user performing the action. However, once a problem is diagnosed and fixed, a positive reward can be achieved. Optimizing R means that the cheapest (least cost) way is used to reach a diagnosis.

O is the observation of the actions. $O(o|a,s')$ is the conditional probability of observation o as action a transitions to state s'. In the HVAC diagnosis problem, each action a will have two or more observations o, depending on the state of the system. For practical reasons, given that a user is performing the action, it is beneficial to have "inconclusive" outcomes among the possible observations.

$\Omega$ is the space of possible observations. $o \in \Omega$.

$b_0$ is a vector of probabilities, one for each state in S. It is the initial belief about the state of the POMDP. In the HVAC diagnosis problem $b_0$ might be the a priori probabilities of the faults.

The classic approach to solving POMDPs is to reduce them to a Markov Decision Problem (MDP) over a belief space consisting of vectors of probabilities (b=($b_1$, $b_2$, $b_3$, . . . )) that the POMDP is in the corresponding states ($s_1$, $s_2$, $s_3$, . . . ). A solution to a POMDP finds an optimal policy, which prescribes the best action for each belief state. In some embodiments of the present invention, optimization module 210 solves the MDP by value iteration. Note that the best action can be the action that leads to a diagnosis that is the least-cost to the user.

Unfortunately, the size of the representation of the value function can grow exponentially, making it notoriously difficult to solve POMDPs for all but the smallest state spaces. In some embodiments, the system may use a variety of point-based value iteration (PBVI) methods to solve the POMDPs. These methods avoid the potentially exponential growth of the representation of the value function by using heuristic methods to select a subset of points where the value function is represented. Nearby points have lower fidelity representations than a single point, so the solution is only an approximation. However this heuristic approach to solving POMDPs has made the POMDPs much more practical. It will be understood that there are a variety of approximation methods that may be applied to approximate the solution of a POMDP, and that formulation of the problem as a POMDP has benefits even when it is not solved exactly.

In the value iteration approach, the policy (best action) is implicitly represented in the value function, i.e., the best action can be determined by comparing the expected value of the actions using the computed values of their next states. This solution allows additional flexibility in interacting with the user. The user may be presented with more than one possible action to perform next (e.g., the best, the second-best, and the third-best actions) to allow the user flexibility. Likewise, with slight loss of optimality the system may enforce external constraints during action selection (e.g., not asking the user to repeat an action, to avoid frustration, even when it's the best action).

The output of optimization module 210, which can include the determined optimal action, is sent to user-engagement module 212, which interacts with and engages the user during the diagnostic process. In some embodiments, user-engagement module 212 may interact with the user via phone, text, email, or online chatting in order to instruct the user to perform certain actions. Note that, during a diagnostic process, it is particularly important that the user remain engaged with the help system. This is accomplished fundamentally by making each action have a positive expected value for the user, i.e., the expected benefit of fixing the degraded system exceeds the costs to the user of the actions performed. While this is a fundamental property of FUEHS and is ensured by optimization module 210, it may be helpful to give the user continuous indication of this expected benefit. Such continuous indication is often provided to the user via user-engagement module 212.

For many users the concept of an "expected" benefit may not be intuitive or easy to understand. Note that even with a positive expected benefit roughly half the time the operation of the system will result in less than its expected benefit. In some embodiments, to make it easy for users to apprehend the expected benefit, user-engagement module 212 presents to the user representative examples of the possible operation of FUEHS. For example, rather than telling a user that the expected benefit of action $a_k$ is $300, user-engagement module 212 may present the user with an example: the suggested action $a_k$ can help distinguish a simple repair you can do yourself, such as cleaning the filters, with a benefit of $600, from a service call with a net benefit of $200. Note that, while such an example may not give a precise explanation to the user (for example, it may not explain why $a_k$ is better than another action $a_m$), it may be easier for the user to appreciate.

In some embodiments, during the diagnostic process, upon determination by optimization module 210 of an optimal action, user-engagement module 212 extracts an "explanation of the expected benefit" from optimization module 210. The extraction procedure will depend on the diagnostic approach used by optimization module 210. For example, an explanation based on informative scenarios (such as the previous example) can be computed using Monte Carlo sampling from the solution of a POMDP. A plurality of scenarios can be generated by sampling paths through the solution of the POMDP, using the optimal policy for choice of actions and drawing randomly from T and O to determine transitions and observations. User-engagement module 212 can then select a few illustrative samples using one or more of the following methods in combination:

1) Select samples that illustrate different possible observations resulting from the current action. These samples will show the user how the next action might affect the outcome.
2) Using the distribution obtained from the Monte Carlo sampling, present examples with benefits at roughly ±σ (variance) in the distribution, to better illustrate to the user the outcome and its uncertainty.
3) Modify the sampling to favor more likely transitions and observations to find more common and representative samples.

These approaches to explanation, while less mathematically informative than the expected value, the variance, and the value at risk, can be more concrete and easier for the user to comprehend.

Also note that an action can incur different costs to the provider and the user of the help system. Moreover, there are different rewards (expected benefits) to the provider and user. The FUEHS focuses primarily on treating the user optimally with respect to their cost-benefit, to motivate them to use the system, and to provide a better help system experience. Therefore, optimization module 210 primarily optimizes operations based on the user's costs and rewards. However, it should be understood that the provider's optimization criteria may be appropriately weighted and incorporated into the objective of the optimization.

When the provider has significant rewards for successful diagnosis (e.g., a utility company, under "decoupling" policies in many states, can potentially profit from prompting successful energy savings activity of its customers), it may benefit the provider to offer additional incentives to the user to keep the user engaged during the diagnostic process. This can be adapted to the current state of the diagnosis. For example, in situations where the user's cost-benefit might be weaker (such as the net benefit being less than a threshold value), and his motivation is lagging, an additional incentive can help complete the diagnosis. In some embodiments, the incentive may be in the form of a rebate to utility bills. In some embodiments, optimization module 210 adjusts the rebate value based on the current state of the diagnosis. If the decision-theoretic diagnosis process (run by optimization module 210) predicts that the subsequently required actions provide less benefit to the user, then optimization module 210 can adjust the rebate value upward. User-engagement module 212 conveys the incentive (rebate) to the user at an appropriate time to motivate the user to perform the actions required for diagnosis.

Termination module 214 is responsible for terminating the diagnostic process. In some embodiments, termination module 214 terminates a process in response to the system reaching a diagnosis of the problem that a user can self-repair. For HVAC diagnosis, this would include such things as: cleaning filters, adjusting registers, defrosting external coils, and improving normal airflow near thermostats. In some embodiments, FUEHS includes these repairs as actions in the system, and can try them early in the process to avoid more costly service calls. Termination module 214 may also terminate a diagnostic process by recommending that professional service be called. This may occur when there are still multiple possible diagnoses, even possibilities of user repair, simply because the decision-theoretic optimization run by optimization module 210 determines that the cost-benefit of additional diagnosis is less than a service call. It is also possible for termination module 214 to halt the diagnostic process without suggesting any repair. For example, the HVAC system may have faults, but the degradation is small enough that it is not worth diagnosing at the present time. Note that, while this appears similar to the previously described "delaying-to-learn-more" action, the difference here is that it terminates the FUEHS diagnostic process. When this termination occurs, modifications to the trigger condition for FUEHS must be made to prevent the FUEHS from starting again too soon. Also, as part of the termination, results from certain actions may be archived for future FUEHS processes.

When the diagnostic system terminates with the suggestion that the user call professional HVAC service, transfer module 216 can transfer useful information to the service technician. In some cases the diagnostic system has identified a single fault that requires professional service. This fault can be suggested to the technician. However, it is much more likely that the diagnostic system will terminate with multiple fault possibilities, because the diagnostic process will stop when actions get costly and fewer problems can be fixed by the user. With multiple possibilities, it is unlikely that simply transferring the internal belief representation will be helpful to the service technician. In some embodiments, before transferring the useful information to the service technician, transfer module 216 extracts an "explanation of the belief state," and then transfers such explanation to the service technician.

The explanation of the belief state may take various forms. If the diagnostic approach is the previously described POMDP, then an explanation of the belief state might be formed by listing (as likely faults) all $d_i$ with high probability $b_i$. For each such $d_i$, the currently completed diagnostic steps (current path) can be traced to identify the largest jump, where $b_i$ increased the most along the path. The action that causes the jump is then reported next to $b_i$ as a plausible explanation for why $d_i$ might be likely. In this way, the most compelling evidence for the diagnosis can be selected. In addition, the explanation might also list unlikely diagnoses, which may include $d_j$ with low probability $b_j$ along with the action that causes the largest decrease in $b_j$. Different diagnostic approaches will require different extraction procedures. For example, the D-matrix approach can form explanations by listing one or more actions that either excluded or included the diagnosis.

FUEHS Diagnosis Process

Figure 3:
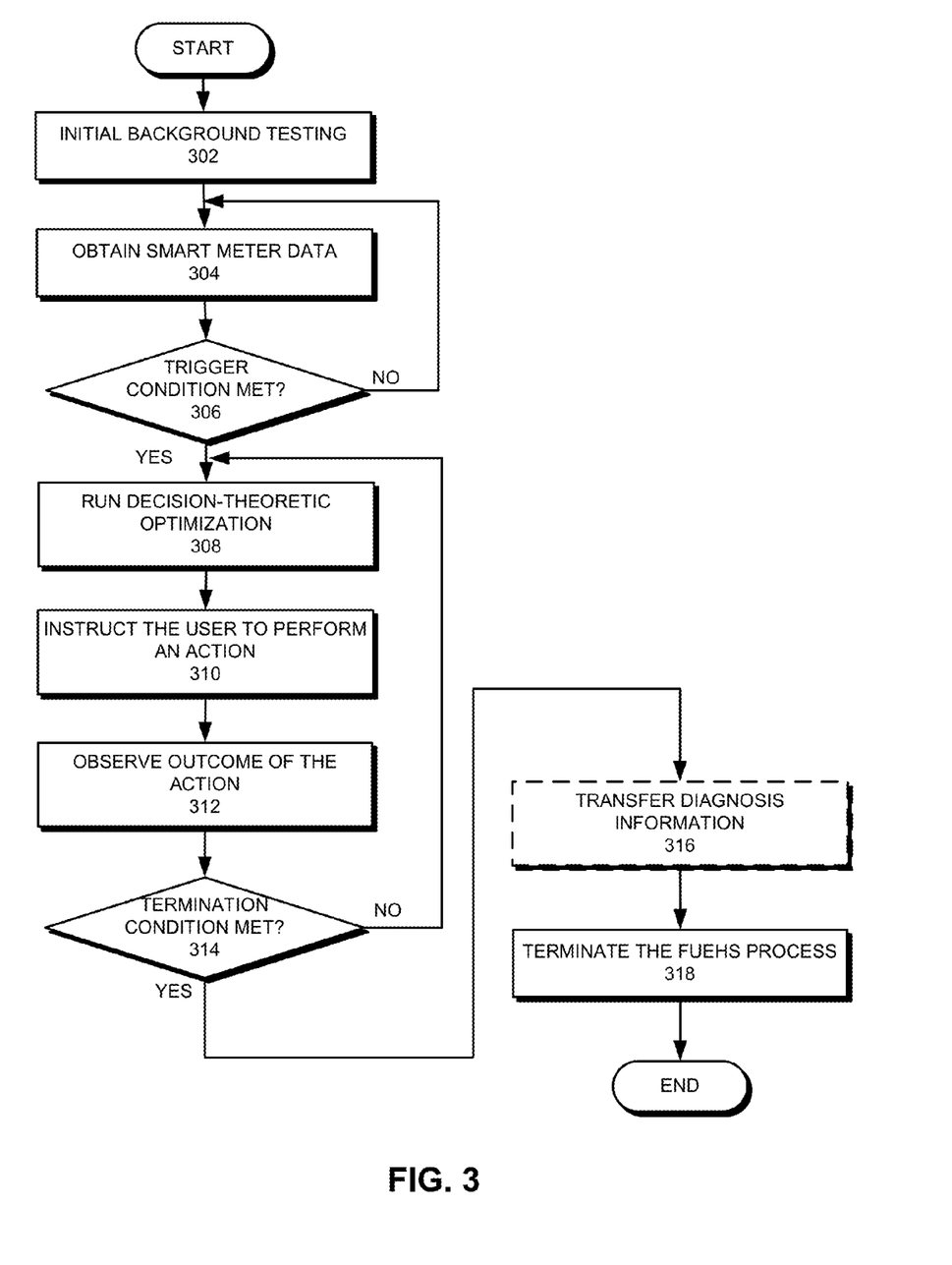
FIG. 3 presents a flowchart illustrating an exemplary diagnosis process, in accordance with an embodiment of the present invention.

FIG. 3 presents a flowchart illustrating an exemplary diagnosis process, in accordance with an embodiment of the present invention. During operation, the help system first performs initial background testing by collecting and analyzing measurement data associated with the product that needs help (operation 302). Note that if the product is an HVAC system, the measurement data can include smart meter data. The initial background testing can be essential in determining the baseline energy-usage profile of the HVAC system. Subsequently, the help system continuously receives smart meter data (operation 304), and waits for the trigger condition to be met (operation 306). In some embodiments, the trigger can include a user request, such as a service call. Moreover, the help system may compare current smart meter data with the baseline energy-usage profile (obtained via background testing) in order to identify bad or abnormal trends of the HVAC system. Such a trend often indicates degradation of the HVAC system. The help system can then estimate the amount of savings that can be achieved by fixing the degradation. If such savings exceeds a threshold, the trigger condition is met. Alternatively, the help system may estimate the net benefit to the user. If the net benefit is positive, the trigger condition is met, and the help system starts an FUEHS diagnostic process.

At the beginning of the FUEHS diagnostic process, the help system performs a decision-theoretic optimization to select, from an action library, an optimal action (operation 308). In some embodiments, the optimal action is chosen to maximize the overall benefit to the user. Note that, to do so, the help system takes into consideration both the end result as well as the cost to the user of actions taken. Various diagnostic approaches may be used by the help system, including but not limited to: D-matrix, POMDP, Bayesian networks, system identification, the general diagnostic engine, particle filtering, and any combination thereof. Depending on the diagnostic approach, the decision-theoretic optimization may be performed differently. In some embodiments, heuristic approaches, such as a PBVI method, are used to solve the POMDP optimization problem.

In some embodiments, the help system may determine, based on the optimization outcome, that it is beneficial to halt the system (adopt a delaying-to-learn-more action) for a predetermined time. In further embodiments where an HVAC system is being diagnosed, such a determination may involve obtaining a weather forecast, and waiting for an appropriate weather condition (such as extremely hot or cold days) in order to gather new data under that weather condition. For example, to help system may learn that, based on whether forecast, the atmosphere temperature will be over 90° F. next week, and determines to halt operations until next week. In some embodiments, the help system may halt operations indefinitely until a certain condition (such as the atmosphere temperature being over a threshold value) is met.

Once an action that involves user engagement is chosen, the help system interacts with the user to instruct the user to perform such an action (operation 310). Most actions are lightweight, requiring little effort or skill from the user. Note that, although these lightweight actions may not be precise enough to be systematically used as HVAC diagnostic tools by technicians or customers, when used selectively in combination with the FUEHS, they contribute to overall improvement in diagnostic efficiency.

After the action has taken place, the help system observes the outcome of the action (operation 312). Note that if the action itself is for the user to observe the current status of the system, such as the settings of the thermostat, the help system receives the user report as the outcome of the action.

Based on the outcome of the action, the help system determines whether a termination condition is met (operation 314). The help system terminates under a number of scenarios, such as when a diagnosis is achieved and a simple repair from the user can fix the problem, or when a diagnosis is achieved and the user is asked to contact a professional service technician to fix the problem. Alternatively, the FUEHS process may also be terminated if the optimization determines that, even if there are still multiple possible diagnoses, the cost benefit to the user for continuing the diagnostic process is less than the cost of a service call. Moreover, the help system may also terminate if it finds that the degradation is small enough to not be worth diagnosing at present. If so, the system terminates without recommending repair or contacting service technicians. If no termination condition is met, the help system continues the diagnostic process by running the optimization to determine the next suitable action (operation 308).

If a termination condition is met, the help system may optionally transfer useful information to the service technician (operation 316). This usually happens when the help system recommends contacting service technicians, either after a diagnosis is reached or when there are still multiple possible diagnoses. The system then terminates the FUEHS process (operation 318). Note that when terminating the help system, results from certain actions may be archived in the help system for use of future FUEHS operations.

Computer and Communication System

Figure 4:
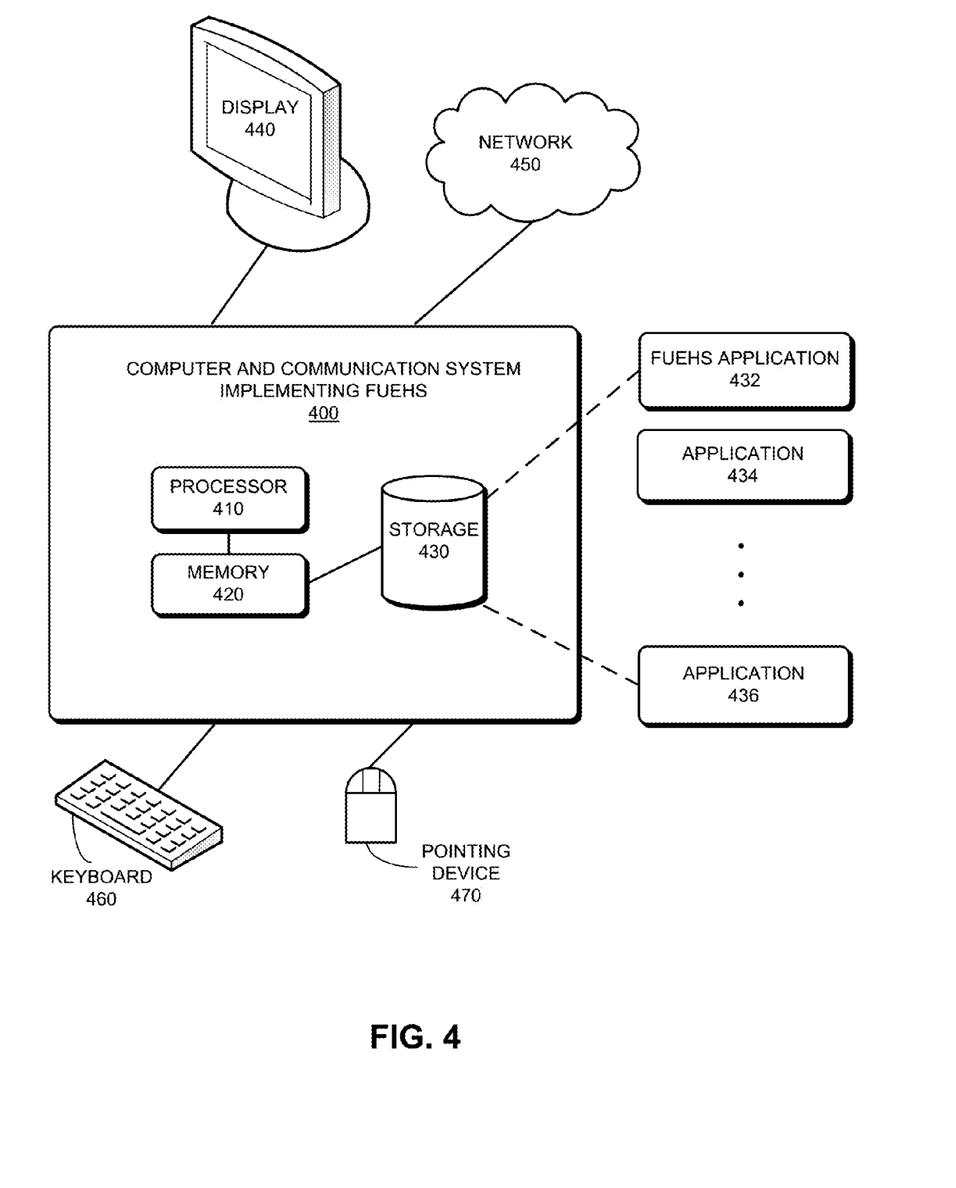
FIG. 4 illustrates an exemplary computer and communication system for implementing a frugal user engagement help system (FUEHS), in accordance with one embodiment of the present invention.

FIG. 4 illustrates an exemplary computer and communication system for implementing a frugal user engagement help system (FUEHS), in accordance with one embodiment of the present invention. In one embodiment, a computer and communication system 400 includes a processor 410, a memory 420, and a storage device 430. Storage device 430 stores an FUEHS application 432, as well as other applications, such as applications 434 and 436. During operation, FUEHS application 432 is loaded from storage device 430 into memory 420 and then executed by processor 410. While executing the program, processor 410 performs the aforementioned functions. Computer and communication system 400 is coupled to an optional display 440, keyboard 460, and pointing device 470. Computer and communication system 400 is coupled to a network 450.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for providing assistance to a user of a product in diagnosing faults in the product, comprising:
   receiving, at a help server, data associated with current and/or past operation of the product;
   performing an optimization to determine a sequence of diagnostic user actions that is expected to maximize a net benefit to the user, wherein the sequence of diagnostic user actions includes one or more of:
      a test associated with the product's operation; and
      a research action to investigate an aspect of the product or its environment; and
      wherein the net benefit to the user accounts for costs to the user for performing a respective diagnostic action and savings to the user for correcting the faults;
   presenting the sequence of diagnostic user actions to the user;
   receiving a response from the user; and
   diagnosing, by the help server, based on the user's response, a likely fault in the product.

2. The method of claim 1, further comprising:
   performing an initial testing to determine a baseline operating profile of the product; and
   comparing the received data associated with the current and/or past operation of the product to determine whether the product is degraded.

3. The method of claim 1, wherein the product includes a heating, ventilation, and air conditioning (HVAC) system, and wherein performing the optimization involves:
   obtaining a weather prediction; and
   based on the obtained weather prediction, including in the determined sequence of actions a delaying-to-learn-more action that delays the interaction with the user for a predetermined time.

4. The method of claim 1, wherein the sequence of diagnostic actions further includes a survey action asking the user one or more survey questions.

5. The method of claim 1, wherein maximizing the net benefit to account for costs to the user further comprises estimating the cost to the user for performing the at least one task, wherein the estimated cost includes a value for time spent by the user performing the action, based on one or more of:
   learning a cost model associated with the user, wherein the cost model specifies how the user values his time and the user's preference and skills;
   asking the user to self-classify; and
   asking the user to answer a set of questions.

6. The method of claim 1, further comprising:
   providing additional incentives including a rebate to the user in response to the optimization determining that the maximized net benefit to the user is less than a predetermined threshold;
   responsive to predicting that a subsequent required action will provide less benefit to the user, increasing a value of the rebate; and
   conveying the rebate to the user to motivate the user to perform the actions required for diagnosis.

7. The method of claim 1, wherein presenting the sequence of diagnostic user actions to the user further involves presenting to the user explanations of the net benefit, thereby motivating the user to perform the at least one task.

8. A non-transitory computer-readable storage medium storing instructions that when executed by a computer cause the computer to perform a method for providing assistance to a user of a product in diagnosing faults in the product, the method comprising:
   receiving, at a help server, data associated with current and/or past operation of the product;
   performing an optimization to determine a sequence of diagnostic user actions that is expected to maximize a net benefit to the user, wherein the sequence of diagnostic user actions includes one or more of:
      a test associated with the product's operation; and
      a research action to investigate an aspect of the product or its environment; and
      wherein the net benefit to the user accounts for costs to the user for performing a respective diagnostic action and savings to the user for correcting the faults;
   presenting the sequence of diagnostic user actions to the user;
   receiving a response from the user; and
   diagnosing, by the help server, based on the user's response, a likely fault in the product.

9. The computer-readable storage medium of claim 8, wherein the method further comprises:
   performing an initial testing to determine a baseline operating profile of the product; and
   comparing the received data associated with the current and/or past operation of the product to determine whether the product is degraded.

10. The computer-readable storage medium of claim 8, wherein the product includes a heating, ventilation, and air conditioning (HVAC) system, and wherein performing the optimization involves:
    obtaining a weather prediction; and
    based on the obtained weather prediction, including in the determined sequence of actions a delaying-to-learn-more action that delays the interaction with the user for a predetermined time.

11. The computer-readable storage medium of claim 8, wherein the sequence of diagnostic actions further includes a survey action asking the user one or more survey questions.

12. The computer-readable storage medium of claim 8, wherein maximizing the net benefit to account for costs to the user further comprises estimating the cost to the user for performing the at least one task, and wherein the estimated cost includes a value for time spent by the user performing the action, based on one or more of:
- learning a cost model associated with the user, wherein the cost model specifies how the user values his time and the user's preference and skills;
- asking the user to self-classify; and
- asking the user to answer a set of questions.

13. The computer-readable storage medium of claim 8, wherein the method further comprises providing additional incentives including a rebate to the user in response to the optimization determining that the maximized net benefit to the user is less than a predetermined threshold;
- responsive to predicting that a subsequent required action will provide less benefit to the user, increasing a value of the rebate; and
- conveying the rebate to the user to motivate the user to perform the actions required for diagnosis.

14. The computer-readable storage medium of claim 8, wherein presenting the sequence of diagnostic user actions to the user further involves presenting to the user explanations of the net benefit, thereby motivating the user to perform the at least one task.

15. A computer system for providing assistance to a user of a product in diagnosing faults in the product, comprising:
- a processor; and
- a storage device coupled to the processor and storing instructions which when executed by the processor cause the processor to perform a method, the method comprising:
  - receiving, at a help server, data associated with current and/or past operation of the product;
  - performing an optimization to determine a sequence of diagnostic user actions that is expected to maximize a net benefit to the user, wherein the sequence of diagnostic user actions includes one or more actions that require the user to perform at least one task, of:
    - a test associated with the product's operation; and
    - a research action to investigate an aspect of the product or its environment; and
  - wherein the net benefit to the user accounts for costs to the user for performing a respective diagnostic action and savings to the user for correcting the faults;
  - presenting the sequence of diagnostic user actions to the user;
  - receiving a response from the user; and
  - diagnosing, by the help server, based on the user's response, a likely fault in the product.

16. The computer system of claim 15, wherein the method further comprises:
- performing an initial testing to determine a baseline operating profile of the product; and
- comparing the received data associated with the current and/or past operation of the product to determine whether the product is degraded.

17. The computer system of claim 15, wherein the product includes a heating, ventilation, and air conditioning (HVAC) system, and wherein performing the optimization involves:
- obtaining a weather prediction; and
- based on the obtained weather prediction, including in the determined sequence of actions a delaying-to-learn-more action that delays the interaction with the user for a predetermined time.

18. The computer system of claim 15, wherein the sequence of diagnostic actions further includes a survey action asking the user one or more survey questions.

19. The computer system of claim 15, wherein maximizing the net benefit to account for costs to the user further comprises estimating the cost to the user for performing the at least one task, and wherein the estimated cost includes a value for time spent by the user performing the action, based on one or more of:
- learning a cost model associated with the user, wherein the cost model specifies how the user values his time and the user's preference and skills;
- asking the user to self-classify; and
- asking the user to answer a set of questions.

20. The computer system of claim 15, wherein the method further comprises providing additional incentives including a rebate to the user in response to the optimization determining that the maximized net benefit to the user is less than a predetermined threshold;
- responsive to predicting that a subsequent required action will provide less benefit to the user, increasing a value of the rebate; and
- conveying the rebate to the user to motivate the user to perform the actions required for diagnosis.

21. The computer system of claim 15, wherein presenting the sequence of diagnostic user actions to the user further involves presenting to the user explanations of the net benefit, thereby motivating the user to perform the at least one task.

* * * * *